Nov. 17, 1970  E. PEARSON  3,540,233

FLEXIBLE COUPLINGS

Filed Nov. 12, 1968

3,540,233
FLEXIBLE COUPLINGS

Edward Pearson, Bradford, England, assignor to The English Electric Company Limited, London, England, a British company
Filed Nov. 12, 1968, Ser. No. 774,872
Claims priority, application Great Britain, Nov. 10, 1967, 51,311/67
Int. Cl. F16d *3/06, 3/14, 3/64*
U.S. Cl. 64—14     4 Claims

ABSTRACT OF THE DISCLOSURE

The invention provides a flexible coupling in which the coupling members 1 and 3 are capable of relative axial movement. This is achieved by providing resilient means in cells 6 defined between the coupling members, said resilient means being in the form of a sandwich comprising two outer layers of resilient material and an inner layer 10 of anti-friction material.

---

This invention relates to flexible couplings. The invention has particular application to a flexible coupling of the kind comprising two coaxial circular members, two sets of ribs which extend radially and axially of the coupling which rib sets are connected alternately to said coaxial members so as to form cells in the annular space between said members, and resilient means provided in said cells. In such a coupling the resilient means are normally in the form of blocks of rubber or like resilient material which are shaped to correspond to the shape of their respective cells.

According to this invention, in a flexible coupling of the kind referred to above, the resilient means for each cell are in the form of an assembly comprising alternate layers of resilient material and anti-friction material, there being at least two layers of one material sandwiching between them a layer of the other material.

Conveniently each assembly may be formed from a tube of resilient material and a layer of anti-friction material inserted into the bore of the tube, and the tube may be separated axially into two halves after insertion of the assembly into its cell, said two halves thus providing two layers of resilient material.

Figure 1:
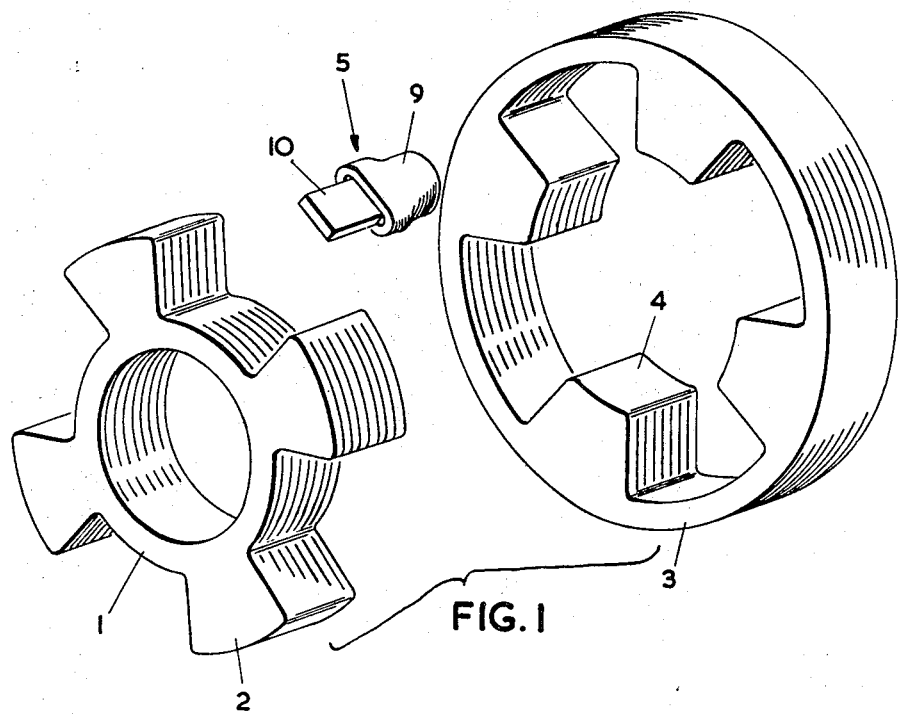
Figure 2:
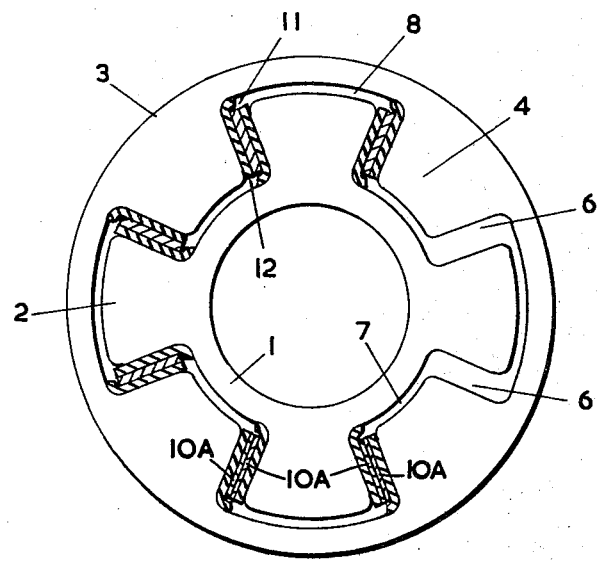

In order that the invention may be readily understood, a flexible coupling constructed in accordance with this invention will now be described, by way of example, with reference to the accompanying drawings, in which:

FIG. 1 is an exploded somewhat diagrammatic view of the coupling members, and one of said resilient means, and FIG. 2 is a cross-sectional view of the assembled coupling.

Referring to the drawings, the coupling comprises essentially an inner annular member 1 having four equi-spaced teeth or ribs 2 which extend radially from its outer periphery, an outer annular member 3 having four equi-spaced teeth or ribs 4 extending radially from its inner periphery, and resilient means 5 for insertion in the cells 6 left between the teeth 2 and 4 when the members 1 and 3 are assembled coaxially one within the other. The coupling members may be made from any material to suit the circumstances of the application of the coupling. In this embodiment the coupling members 1 and 3 are formed by steel laminations, which are assembled into the required lengths and joined together, e.g., by adhesive, welding, riveting or screwing. However, it will be appreciated that any other suitable process may be used for forming the members, e.g., casting or moulding.

The dimensions of the members 1 and 3 and the shape and dimensions of the teeth 2 and 4 of the members are so chosen that, when they are assembled one within the other, eight equi-spaced, radially extending, substantially rectangular cells 6 are provided, and inner and outer arcuate spaces 7 and 8 respectively are provided alternately between the members which spaces extend between adjacent cells.

Each resilient means 5 is in the form of an assembly comprising a tube 9 of resilient material, such as rubber or plastic, with a strip or layer 10 of "anti-friction" material, i.e., material having a low coefficient of friction, such as polytetrafluoroethylene or polypropylene, inserted into the bore of the tube; the tube 9 and strip 10 may be of the same length, although this is not essential. The assemblies are conveniently fitted into their respective cells 6 firstly by inserting an assembly into alternate ones of the cells 6 then, secondly, by applying relative torque between the coupling members in order to compress the inserted assemblies so that the remaining assemblies can be inserted into the intermediate cells.

The thickness of the assemblies is so chosen that when all are in position in their respective cells 6 they are under slight compression so that there is no unrestrained relative rotary motion between the coupling members 1 and 3. Thus, the wall of each tube 9 is compressed against each face of its strip 8 and this wall is then axially slit at the positions referenced 11 and 12, to separate the tube into two halves which constitute two layers of resilient material.

It will be appreciated that the coefficient of friction between the layers of resilient material of the assemblies and the teeth 2 and 4 of the coupling members is substantially higher than that between the said layers and the strips of anti-friction material. Thus, if the coupling members 1 and 3 are moved axially relative to each other, all relative movement occurs between the layers of resilient material and the strips of anti-friction material of the assemblies. As the coefficient of friction of this latter combination is chosen to be very low, the restraint to relative axial movement of the coupling members is also very low.

To ensure that no relative movement takes place between the coupling members and the layers of resilient material of the assemblies, these layers may be bonded by adhesive or similar means to the coupling members. Alternatively if, as in this embodiment, the coupling members are each formed of steel laminations, the burrs attendant on the punching process required to produce these laminations are sufficient to ensure that no relative movement takes place between the layers of resilient material and the coupling members.

A flexible coupling constructed in accordance with the invention has application, for example, in an electric induction motor such as described in U.S. patent application Ser. No. 706,115 of Clifford G. Done, Eric R. Casey, and Edward Pearson, filed Feb. 16, 1968, now Pat. No. 3,502,918. In this application an induction motor is described which is of the kind having a squirrel cage rotor winding with end rings and a brake mechanism which is axially movable relative to the rotor so as to move the brake mechanism into and out of the braking position, the brake mechanism being resiliently biased towards the braking position and movable away therefrom by electromagnetic forces established in the motor when it is energized. Thus, the flexible coupling may conveniently provide for driving engagement between the squirrel cage rotor and the brake mechanism and also for the necessary relative axial movement to take place between the said rotor and brake mechanism.

In a modification of the invention two similar abutting strips 10A of anti-friction material (see FIG. 2) may be inserted into each tube 9 so that when the resilient assemblies are fitted into the respective cells 6 of the coupling, any relative axial movement between the coupling members 1 and 3 occurs at the interfaces between strips 10A.

I claim:
1. A flexible coupling, including first and second coaxial coupling members each having a set of radial ribs which extend parallel to the axis of the members, the ribs of one set intermeshing with the ribs of the other set; and resilient means between adjacent ribs of the two sets, each said resilient means including layers of resilient material respectively in contact with said adjacent ribs, and at least one layer of material having a low coefficient of friction positioned between, and separate from, said layers of resilient material to allow axial relative movement between said members.

2. A coupling according to claim 1, in which the layers of resilient material comprise sections of a resilient tube encircling said layer of material having a low coefficient of friction, which sections are separated when the tube is in position between said adjacent ribs.

3. A coupling according to claim 1, in which each said resilient means includes two separate adjacent layers of said material having a low coefficient of friction, said separate layers being positioned between said layers of resilient material.

4. A coupling according to claim 1, in which the layers of resilient material are bonded in position in contact with said adjacent ribs.

References Cited

UNITED STATES PATENTS

| 2,301,659 | 11/1942 | Ricefield | 64—14 |
| 2,532,754 | 12/1950 | Beck | 64—23 |
| 2,916,226 | 12/1959 | McGraw. | |
| 3,084,524 | 4/1963 | McLay | 64—14 |
| 3,183,684 | 5/1965 | Zeidler | 64—23 |

FOREIGN PATENTS 767,243    1/1957    Great Britain.

JAMES A. WONG, Primary Examiner

U.S. Cl. X.R.

64—23, 27